US00RE34859E

United States Patent [19]

Endo et al.

[11] E Patent Number: Re. 34,859

[45] Reissued Date of Patent: Feb. 14, 1995

[54] THERMALLY OPERATED APPARATUS FOR MAKING A PLATE

[75] Inventors: Toshio Endo, Shiroishi; Mitsuo Sato, Shibata, both of Japan

[73] Assignee: Ricoh Company, Ltd., Tokyo, Japan

[21] Appl. No.: 807,044

[22] Filed: Dec. 12, 1991

Related U.S. Patent Documents

Reissue of:

[64] Patent No.: 4,887,168
Issued: Dec. 12, 1989
Appl. No.: 135,081
Filed: Dec. 18, 1987

[30] Foreign Application Priority Data

Dec. 20, 1986 [JP] Japan ..... 61-304844

[51] Int. Cl.[6] ..... H04N 1/032; H04N 1/04; H04N 1/23; H04N 1/40

[52] U.S. Cl. ..... 358/299; 358/296; 358/304; 358/450

[58] Field of Search ..... 358/299, 296, 450, 401, 358/304; 346/76 PH, 76 R

[56] References Cited

U.S. PATENT DOCUMENTS 4,475,128 10/1984 Koumura ..... 358/296
4,591,904 5/1986 Urabe ..... 358/450
4,729,036 3/1988 Ikeda ..... 358/296

FOREIGN PATENT DOCUMENTS 49-58904 6/1974 Japan .
59-45155 3/1984 Japan .
59-107231 7/1984 Japan .
61-285865 12/1986 Japan .

*Primary Examiner*—Scott A. Rogers
*Attorney, Agent, or Firm*—Oblon, Spivak, McClelland, Maier & Neustadt

[57] ABSTRACT

A thermally operated plate making apparatus with a capability of producing a plate which carries a plurality of images of a small-size original document side by side thereon by a continuous operation includes a document transport roller pair for transporting an original document, a reading device made up of optical elements a CCD image sensor and others for reading the document and sensors for sensing the transport conditions of the document, and a writing device made up of a thermal head for engraving an image of the document in a stencil and a stencil transport roller pair for transporting the stencil. A control device is provided for controlling the entire apparatus to engrave a plurality of document images in a plate making area of the stencil in a continuous manner. The control device comprises a CPU, a ROM, a RAM, etc.

47 Claims, 4 Drawing Sheets

THERMALLY OPERATED APPARATUS FOR MAKING A PLATE

Matter enclosed in heavy brackets [ ] appears in the original patent but forms no part of this reissue specification; matter printed in italics indicates the additions made by reissue.

*This application is a reissue of U.S. Pat. No. 4,887,168.*

BACKGROUND OF THE INVENTION

The present invention relates to a thermally operated plate making apparatus capable of producing a plate on which a plurality of images of a small-size document are engraved side by side by a continuous operation.

A prior art apparatus of the kind described includes a reading device and a warning device. The reading device is made up of a transport member which is so positioned as to allow an original document to be fed on and along a glass platen, a reading member for reading the document being transported by the transport member through an optical arrangement, and a sensing member for sensing the document which is read by the reading member. On the other hand, the writing device is made up of a thermal head, and a platen roller rotatable for transporting a stencil, which is paid out from a roll, while pressing it against a heating section of the thermal head. Such a prior art apparatus is capable only of faithfully reproducing a single document and engraving it in a stencil which corresponds to a single plate. Specifically, it cannot produce a plate on which, for example, two images of a single document of format B5 are provided side by side by a continuous operation by using a stencil whose plate making area is of format B4, without preparing beforehand a document of format B4 on which two images of the B5 document are printed side by side. The preparation of such a preliminary document is disproportionately time- and labor-consuming and troublesome.

SUMMARY OF THE INVENTION

It is, therefore, an object of the present invention to provide a thermally operated plate making apparatus which is free from the drawback particular to the prior art apparatus as discussed above.

It is another object of the present invention to provide a thermally operated plate making apparatus capable of producing a plate on which a plurality of images of a small-size document are engraved side by side by a continuous operation.

It is another object of the present invention to provide a generally improved thermally operated plate making apparatus.

A thermally operated apparatus for making a plate of the present invention comprises a transporting member positioned to allow an original document to be fed on and along a glass platen, a reading member for reading the document being transported by the transporting member, sensors for sensing the document which is read by the reading member and producing a sense signal each, a thermal head for engraving an image of the original document in a stencil, a stencil transport roller rotatable for transporting the stencil while urging the stencil against the thermal head, a setting device for setting the number of delimited fields which are to be defined in a plate making area of the stencil side by side in an intended direction of stencil transport so as to produce a plate by a continuous operation, and producing a set signal, and a controller for controlling the stencil transport roller such that when the sense signal and the set signal are inputted, whether the plate making area of the stencil is long enough to accommodate the plurality of fields is decided and, if the result of the decision is positive, rotation of the stencil transport roller is temporarily stopped until the document has been discharged by the transporting member to become ready to be fed again and, if the result of the decision is negative, rotation of the stencil feed roller is not stopped.

DESCRIPTION OF THE PREFERRED EMBODIMENT

Figure 1:
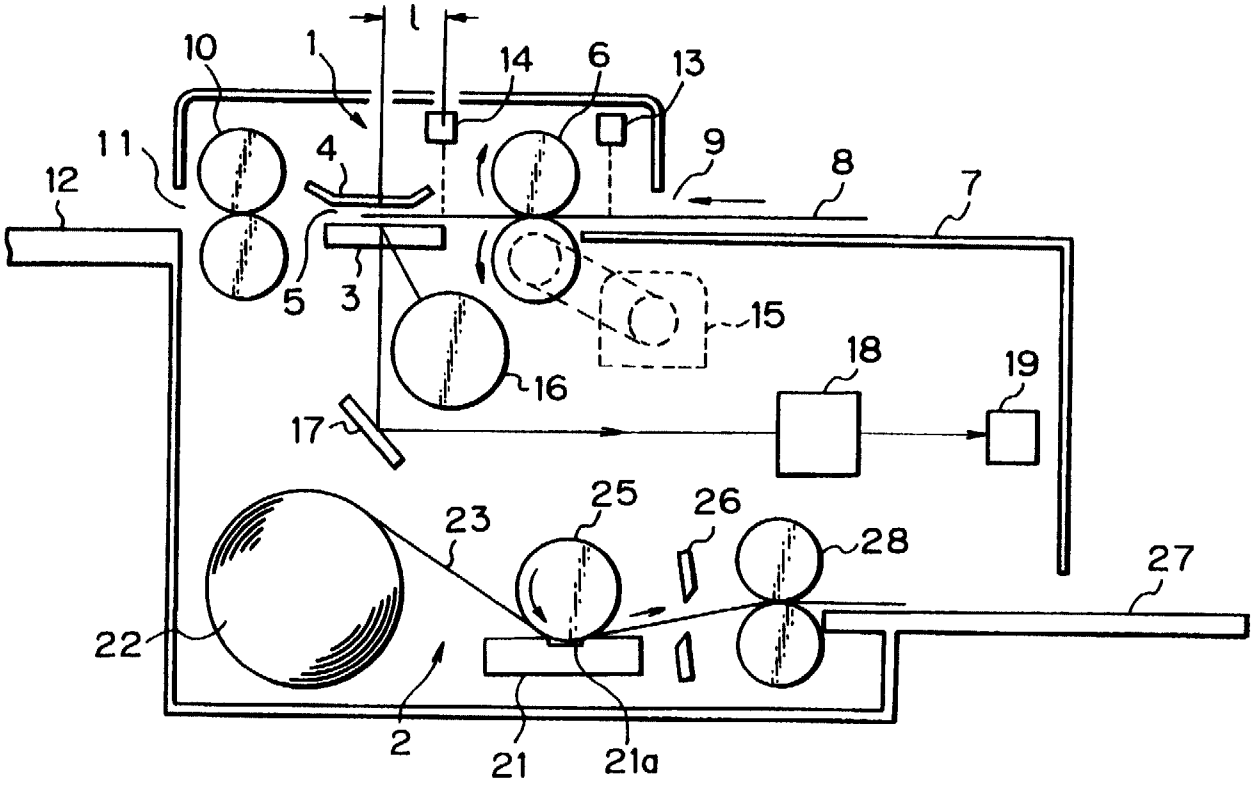
FIG. 1 is a schematic side elevation of a thermal plate producing apparatus embodying the present invention.

Referring to FIG. 1 of the drawings, a thermally operated plate making machine embodying the present invention is shown and generally comprised of a reading device 1 and a writing device 2. The reading device 1 includes a document transport path 5 which is defined by a glass platen 3 and an upper guide plate 4. A transport roller pair 6 is located upstream of the transport path 5 so as to feed an original document 8 from a table 7 to the transport path 5 by way of an inlet 9. Located downstream of the transport path 5 is a discharge roller pair 10 for discharging the document 8 from the transport path 5 to a tray 12 through an outlet 11. A first and a second sensor 13 and 14, respectively, are provided for sensing the document 8. A stepping motor 15 is drivably connected to the lower transport roller 6. Arranged below the glass platen 3 are a fluorescent lamp 16, a mirror 17, a lens unit 18, and a CCD (charged coupled device) image sensor 16 which serves as an optical reading member. The fluorescent lamp 19 is adapted to illuminate the document 8 when the latter is brought to substantially the center of the glass platen 3.

The writing device 2 includes a thermal head 21 which is provided with a heating section 21a on its surface, and a platen roller 25 rotatable for transporting a stencil 23, which is paid out from a roll 22, while pressing the stencil 23 against the heating section 21a of the thermal head 21. Positioned downstream of the thermal head 21 and platen roller 25 with respect to an intended direction of stencil feed are a cutter 26 for cutting the stencil 23 at a predetermined length, and a transport roller pair 28 for driving the cut length of stencil 23 to a tray 27.

Figure 2:
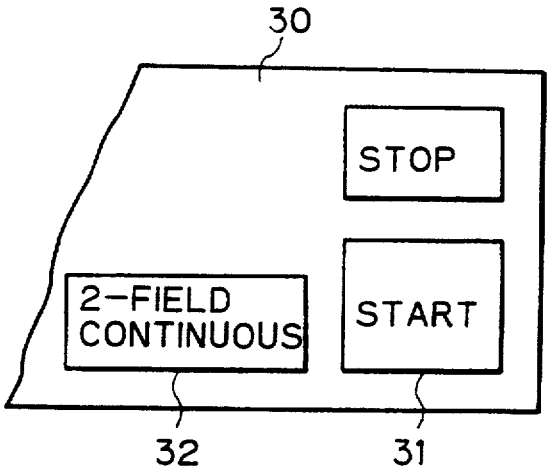
FIG. 2 is a schematic fragmentary view of a control panel of the apparatus as shown in FIG. 1.

FIG. 2 shows a part of a control panel 30 which is provided on the apparatus of FIG. 1. As shown, the control panel 30 includes a start key 31 and a two-field continuous key 32 located next to the start key 31.

Figure 3:
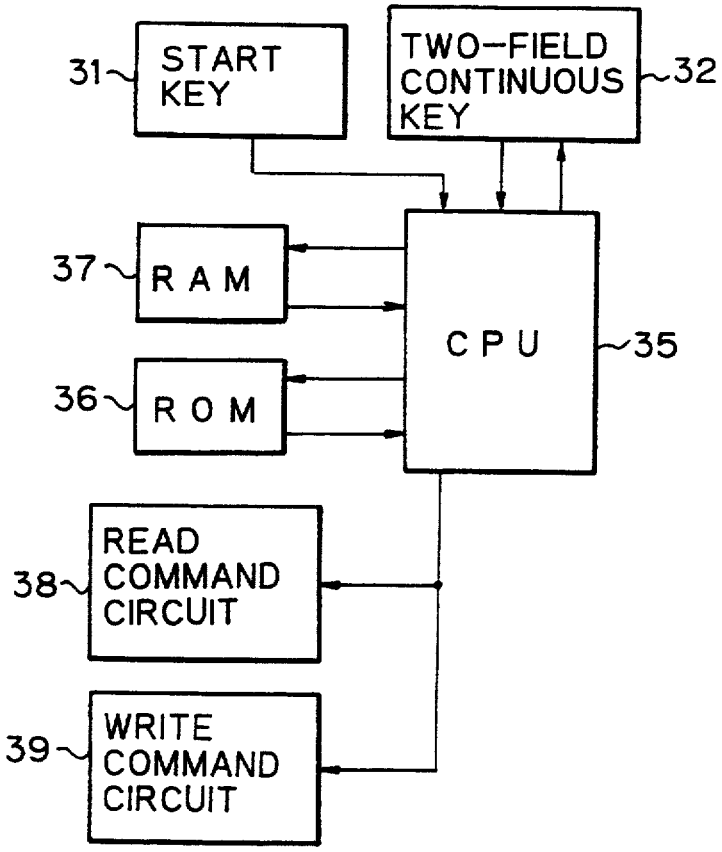
FIG. 3 is a block diagram showing a controller installed in the apparatus of FIG. 1.
Figure 4:
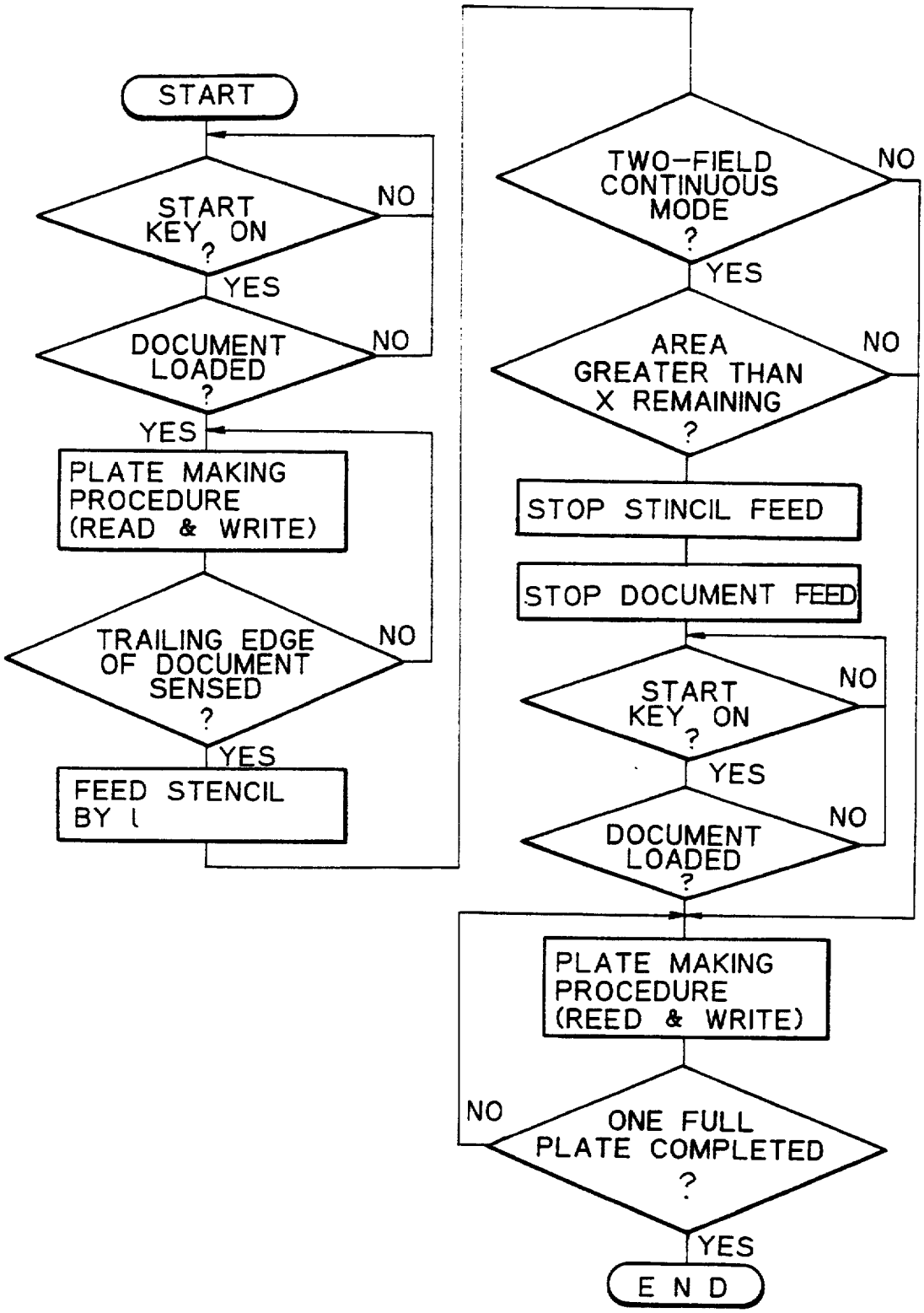
FIG. 4 is a flowchart demonstrating the operation of the apparatus as shown in FIG. 1.

Referring to FIG. 3, a controller build in the machine includes a CPU (central processing unit) 35 for controlling the entirety of the machine, a ROM (random access memory) 36 for storing a plate making length corresponding to one plate and a program represented which is by a flowchart in FIG. 4, and a RAM (random access memory) 37. The CPU 35 is connected to the start key 31, the two-field continuous key 32, a read command circuit 38, and a write command circuit 39.

Figure 5A:
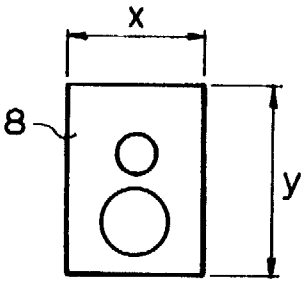
FIGS. 5A, 5B and 5C are views showing a relationship between the size of an original document and a plate making area of a stencil, FIG. 5A showing an original document and FIGS. 5B and 5C a stencil.
Figure 5B:
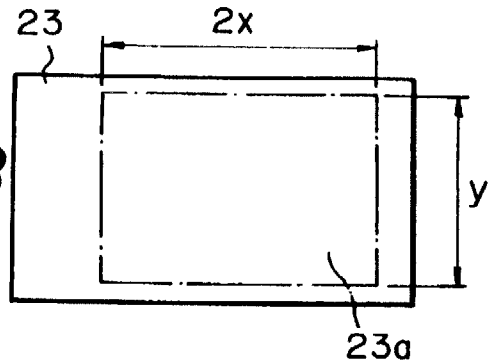

The operation of the apparatus will be described assuming that the document 8 is of format B5 which is dimensioned X×Y (FIG. 5A), that the stencil 23 is of format B4 having a plate making area 23a which is dimensioned 2X×Y (FIG. 5B), and that a plate having two images of the document 8 side by side thereon (FIG. 5C) is to be produced by a two-field continuous mode.

Specifically, the two-field continuous key 32 and, then, the start key 31 is depressed. Subsequently, the document 8 is placed on the table 7 and, then, inserted into the inlet 9 until it becomes stopped with its leading end abutting against the transport roller pair 6. The first sensor 13 senses the document 8 inserted and, several seconds later, the transport roller pair 6 is driven to transport the document 8 into the transport path 5 as indicated by an arrow in FIG. 1. As the second sensor 14 senses the leading end of the document 8, the transport roller pair 6 is brought to a halt after the document 8 has been fed by a length l as measured from the sensor 14 to the exposing station. This feed length l is ensured by controlling the rotation angle of the stepping motor 15. When the document 8 reaches the exposing station, light issuing from the lamp 16 is reflected by the document 8, then redirected by the mirror 17, and then focused by the lens unit 18 toward the CCD image sensor 19. The light incident to the CCD image sensor 19 is photoelectrically converted into an electric signal and applied to the CPU 35 of the controller as shown in FIG. 3.

In parallel with the reading operation described above, the platen roller 25 urging the stencil 23 against the heating section 21a of the thermal head 21 is rotated to feed the stencil 23 in a direction indicated by an arrow in FIG. 1. The heating section 21 to which an electric signal is fed from the CPU 35 is energized to write image data on the stencil 23. In this manner, the stencil 23 is sequentially engraved as the document 8 is fed. After the second sensor 14 has sensed the trailing end of the document 8, the document 8 and the stencil 23 are further fed by the distance of l each. Then, the CPU 35 received the output signals of the second sensor 14 and key 32 decides whether the remaining part of the plate making area 23a of the stencil 23 is great enough to accommodate another image of the document 8 by using the RAM 37. If the result of decision is positive, the rotation of the platen roller 25 is interrupted to interrupt the engraving operation. While the platen roller 25 is in a halt, the transport roller pair 6 and discharge roller pair 10 are further rotated to fully discharge the document 8 onto the tray 12.

Subsequently, the document 8 is removed from the tray 12 and then placed on the table 7 again. As the document 8 is fed through the inlet 9, the previously stated procedure is repeated, i.e., the rotation of the transport roller pair 6 and, therefore, the feed of the document 8 is stopped after the document 8 has been fed by the distance l as measured from the position where the second sensor 14 senses the leading end of the document 8. When the start key 31 is depressed again, the CCD image sensor 19 reads the document 8 and the heating section 21a of the thermal head 21 engraves the stencil 23, as described earlier. Upon completion of a plate having predetermined length, the heating section 21a of the thermal head 21 is deenergized, but the platen roller 25 is further rotated to feed the stencil 23 by a predetermined length and, then, stopped. As the platen roller 25 is brought to a halt, the cutter 26 is operated to cut the stencil 23 at a predetermined length. The cut length of stencil 23 is discharged by the transport roller 28 onto the tray 27. The document 8, too, is discharged onto the tray 12 by the transport roller pair 6 and discharge roller pair 10.

Figure 5C:
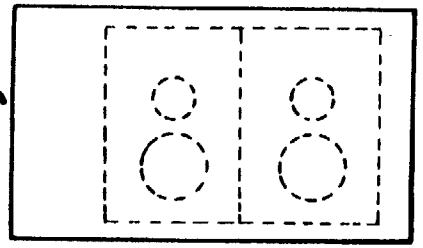

As shown in FIG. 5C, by the sequence of steps described above, the stencil 23 whose plate making area 23a is of format B4 is printed with two images of the same document 8 side by side in the lengthwise direction of the stencil, or plate 23.

When the length of the remaining part of the area 23a is shorter than predetermined one, i.e., format B5 as decided by the CPU 35 at the instant when the second sensor 14 has sensed the trailing end of the document 8, it is impossible to print two images of the document 8 side by side in the area 23a. Hence, the CPU 35 drives the stencil 23 by a length of one full plate without interrupting the rotation of the platen roller 25. Hence, in the event when one inserts a document of format B4, then unintentionally depresses the continuous key 32, and then depresses the start key 31, an ordinary plate making procedure occurs in place of two-field continuous printing.

Figure 6A:
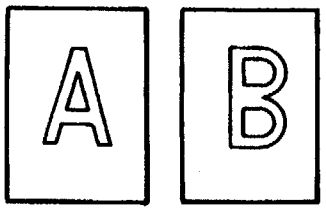
FIGS. 6A and 6B are views representative of an exemplary procedure for producing a plate by using two small-size documents.
Figure 6B:
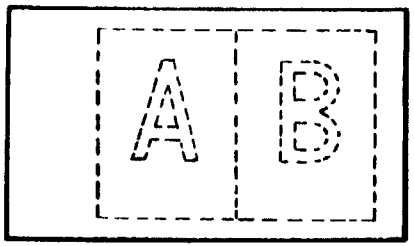

FIGS. 6A and 6B show a case wherein images A and B of two different documents each being of format B5 are engraved side by side on a stencil whose plate making area is of format B4. Printing the images A and B carried on such a stencil on a paper of format B4 halves the period of time necessary for printing, compared to preparing plates of B4 documents one by one and then producing a copy. In addition, only one stencile suffices. Further, when it is desired to produce a number of copies of format B4 by using some B5 documents, then fold each of them in two and paginate, and then bind them, the two-field continuous key 32 simplifies the procedure. In the case that two images of a B5 document are to be printed side by side on a B4 paper and, then, cut in two, the key 32 eliminates the need for a copier.

In summary, it will be seen that in accordance with the present invention a plurality of images of a small-size document can be produced side by side on a plate and, thereby, it is needless to produce a preliminary document having a plurality of images of a small-size document thereon by use of a copier. In addition, a simple and rapid plate making operation is promoted.

Various modifications will become possible for those skilled in the art after receiving the teachings of the present disclosure without departing from the scope thereof.

What is claimed is:

1. A thermally operated apparatus for making a plate comprising:

transporting means positioned to allow an original document to be fed on and along a glass platen;

reading means for reading said document being transported by said transporting means;

sensing means for sensing said document which is read by said reading means and producing a sense signal;

a thermal head for engraving an image of said original document in a stencil;

a stencil transport roller rotatable for transporting said stencil while urging said stencil against said thermal head;

setting means for setting the number of delimited fields which are to be defined in a plate making area of said stencil side by side in an intended direction of stencil transport so as to produce a plate by a continuous operation, and producing a set signal;

control means for controlling said stencil transport roller such that when said sense signal and said set signal are inputted, whether said plate making area of said stencil is long enough to accommodate said plurality of fields is decided and, if the result of said decision is positive, rotation of said stencil transport roller is temporarily stopped until said document has been discharged by said transporting means to become ready to be fed again and, if the result of said decision is negative, rotation of said stencil feed roller is not stopped; and means for cutting said transported stencil at a predetermined length in response to the completion of the formation of an image on said stencil.

2. An apparatus as claimed in claim 1, wherein said transporting means, said reading means and said sensing means constitute a reading device.

3. An apparatus as claimed in claim 1, wherein said thermal head and said stencil transport roller constitute a writing device.

4. An apparatus as claimed in claim 1, wherein said transport means comprises a roller pair for transporting said document and drive means for driving said roller pair.

5. An apparatus as claimed in claim 4, wherein said drive means comprises a stepping motor.

6. An apparatus as claimed in claim 4, wherein said sensing means comprises a first sensor located upstream of said roller pair, and a second sensor located downstream of said roller pair.

7. An apparatus as claimed in claim 4, wherein said thermal head comprises a heating section which presses said stencil in cooperation with said stencil transport roller for writing an image of said document on said stencil.

8. An apparatus as claimed in claim 1, wherein said control means comprises a central processing unit for controlling the entirety of said apparatus.

9. An apparatus as claimed in claim 8, wherein said control means further comprises a read only memory for storing the length of said plate making area corresponding to one plate and a predetermined program.

10. An apparatus as claimed in claim 1, further comprising a start key for starting a plate making operation and a two-field continuous key for setting up a two-field continuous mode.

11. A thermally operated apparatus for making a plate, comprising:

feed means positioned to allow documents to be fed one by one on and along a glass platen;

reading means for reading said documents being fed one by one by said feed means;

sensing means for sensing each document which is read by said reading means and producing a sense signal;

a thermal head for engraving images of said documents in a roll fed stencil;

a stencil transport roller rotatable for transporting said stencil while urging said stencil against said thermal head;

setting means for setting the number of a plurality of delimited fields which are to be defined in a plate making area of said stencil side by side in an intended direction of stencil tranport so as to produce a plate by a continuous operation, and producing a set signal;

cutter means for cutting said transported stencil at a predetermined length in accordance with said number of the plurality of delimited fields when said plate has been completed; and control means for controlling said stencil transport roller such that when said sense signal and said set signal are inputted and an image of a present document has been formed on one of said plurality of delimited fields of said plate making area of said stencil, whether the remaining of said plurality of delimited fiels of said plate making area of said stencil are long enough to accommodate an image of a next document is decided and, if the result of said decision is positive, rotation of said stencil transport roller is temporarily stopped until said present document has been discharged by said feed means to become said next document ready to be fed and, if the result of said decision is negative, rotation of said stencil transport roller is not stopped.

12. An apparatus as claimed in claim 11, wherein said present document corresponds to said next document.

*13. A thermally operated apparatus for making a plate, comprising:*

*a start key for starting a plate making operation;*

*a plural-field continuous key for setting up a plural-field continuous mode;*

*reading means for reading original documents on a glass platen;*

*sensing means for sensing each document which is read by said reading means and producing a sense signal;*

*a thermal head for engraving images of said documents in a roll fed stencil;*

*a stencil transport roller rotatable for transporting said stencil while urging said stencil against said thermal head;*

*setting means for setting the number of a plurality of delimited fields which are to be defined in a plate making area of said stencil side by side in an intended direction of stencil transport so as to produce a plate by a continuous operation, and producing a set signal;*

*cutter means for cutting said transported stencil at a predetermined length in accordance with said number of the plurality of delimited fields when said plate has been completed; and*

*control means for controlling said stencil transport roller and said reading means in response to said sense signal and said set signal such that said stencil transport roller continues transporting said stencil while all of said documents on said glass platen are continuously read by said reading means.*

*14. An apparatus as claimed in claim 13, wherein said reading means and said sensing means constitute a reading device.*

*15. An apparatus as claimed in claim 13, wherein said thermal head and said stencil transport roller constitute a writing device.*

*16. An apparatus as claimed in claim 13, wherein said thermal head comprises a heating section which presses said stencil in cooperation with said stencil transport roller for writing an image of said document on said stencil.*

*17. An apparatus as claimed in claim 13, wherein said control means comprises a central processing unit for controlling the entirety of said apparatus.*

*18. An apparatus as claimed in claim 17, wherein said control means further comprises a read only memory for storing the length of said plate making area corresponding to one plate and a predetermined program.*

*19. A thermally operated apparatus for making a plate comprising:*

*a start key for starting a plate making operation;*

*a plural-field continuous key for setting up a plural-filed continuous mode;*

*feed means positioned to allow original documents to be fed one by one on and along a glass platen;*

*reading means for reading said documents being fed one by one by said feed means;*

*sensing means for sensing each document which is read by said reading means and producing a sense signal;*

*a thermal head for engraving images of said documents in a roll fed stencil;*

*a stencil transport roller rotatable for transporting said stencil while urging said stencil against said thermal head;*

*setting means for setting the number of a plurality of delimited fields which are to be defined in a plate making area of said stencil side by side in an intended direction of stencil transport so as to produce a plate by a continuous operation, and producing a set signal;*

*cutter means for cutting said transported stencil at a predetermined length in accordance with said number of the plurality of delimited fields when said plate has been completed; and*

*control means for controlling said stencil transport roller in response to said sense signal and said set signal such that when an image of a present document has been formed on one of said plurality of delimited fields of said plate making area of said stencil, rotation of said stencil transport roller is temporarily stopped until said present document has been discharged by said feed means, and when an image of a next document has been formed on the other of said plurality of delimited fields of said plate making area of said stencil, rotation of said stencil transport roller is temporarily stopped until said next document has been discharged by said feed means.*

*20. An apparatus as claimed in claim 19, wherein said present document corresponds to said next document.*

*21. An apparatus as claimed in claim 19, wherein said feed means, said reading means and said sensing means constitute a reading device.*

*22. An apparatus as claimed in claim 19, wherein said thermal head and said stencil transport roller constitute a writing device.*

*23. An apparatus as claimed in claim 19, wherein said feed means comprises a roller pair for feeding said document and drive means for driving said roller pair.*

*24. An apparatus as claimed in claim 23, wherein said drive means comprises a stepping motor.*

*25. An apparatus as claimed in claim 23, wherein said sensing means comprises a first sensor located upstream of said roller pair, and a second sensor located downstream of said roller pair.*

*26. An apparatus as claimed in claim 23, wherein said thermal head comprises a heating section which presses said stencil in cooperation with said stencil transport roller for writing an image of said document on said stencil.*

*27. An apparatus as claimed in claim 19, wherein said control means comprises a central processing unit for controlling the entirety of said apparatus.*

*28. An apparatus as claimed in claim 27, wherein said control means further comprises a read only memory for storing the length of said plate making area corresponding to one plate and a predetermined program.*

*29. A thermally operated apparatus for making a plate, comprising:*

*a start key for starting a plate making operation;*

*a plural-field continuous key for setting up a plural field continuous mode;*

*reading means for reading an original document;*

*sensing means for sensing each document which is read by said reading means and producing a sense signal;*

*a thermal head for engraving images of said documents in a roll fed stencil;*

*a stencil transport roller rotatable for transporting said stencil while urging said stencil against said thermal head;*

*setting means for setting the number of a plurality of delimited fields which are to be defined in a plate making area of said stencil side by side in an intended direction of stencil transport so as to produce a plate, and producing a set signal;*

*cutter means for cutting said transport stencil at a predetermined length when said plate has been completed; and*

*control means for controlling said reading means in response to said set signal such that a plurality of original documents are continuously read by said reading means to engrave in said stencil images of said plurality of the documents read by said reading means.*

*30. An apparatus as claimed in claim 29, wherein said reading means and said sensing means constitute a reading device.*

*31. An apparatus as claimed in claim 29, wherein said thermal head and said stencil transport roller constitute a writing device.*

*32. An apparatus as claimed in claim 29, wherein said thermal head comprises a heating section which presses said stencil in cooperation with said stencil transport roller for writing an image of said document on said stencil.*

*33. An apparatus as claimed in claim 29, wherein said control means comprises a central processing unit for controlling the entirety of said apparatus.*

*34. An apparatus as claimed in claim 33, wherein said control means further comprises a read only memory for storing the length of said plate making area corresponding to one plate and a predetermined program.*

*35. A thermally operated apparatus for making a plate, comprising:*

*a start key for starting a plate making operation;*

*a plural-field continuous key for setting up a plural-field continuous mode;*

*feed means positioned to allow original documents to be fed one by one on and along a glass platen;*

*reading means for reading said documents being fed one by one by said feed means;*

*sensing means for sensing each document which is read by said reading means and producing a sense signal;*

*a thermal head for engraving images of said documents in a roll fed stencil;*

*a stencil transport roller rotatable for transporting said stencil while urging said stencil against said thermal head;*

*setting means for setting the number of a plurality of delimited fields which are to be defined in a plate making area of said stencil side by side in an intended direction of stencil transport so as to produce a plate by a continuous operation, and producing a set signal;*

*cutter means for cutting said transported stencil at a predetermined length when said plate has been completed; and*

*control means for controlling said stencil transport roller in response to said sense signal and said set signal such that when an image of a present document has been formed on one of said plurality of delimited fields of said plate making area of said stencil, rotation of said stencil transport roller is temporarily stopped until said reading means starts reading a next document, and when an image of said next document has been formed on the other of said plurality of delimited fields of said plate making area of said stencil, rotation of said stencil transport roller is temporarily stopped.*

*36. An apparatus as claimed in claim 35, wherein said present document corresponds to said next document.*

*37. An apparatus as claimed in claim 35, wherein said feed means, said reading means and said sensing means constitute a reading device.*

*38. An apparatus as claimed in claim 35, wherein said thermal head and said stencil transport roller constitute a writing device.*

*39. An apparatus as claimed in claim 35, wherein said feed means comprises a roller pair for feeding said document and drive means for driving said roller pair.*

*40. An apparatus as claimed in claim 39, wherein said drive means comprises a stepping motor.*

*41. An apparatus as claimed in claim 39, wherein said sensing means comprises a first sensor located upstream of said roller pair, and a second sensor located downstream of said roller pair.*

*42. An apparatus as claimed in claim 39, wherein said thermal head comprises a heating section which presses said stencil in cooperation with said stencil transport roller for writing an image of said document on said stencil.*

*43. An apparatus as claimed in claim 35, wherein said control means comprises a central processing unite for controlling the entirely of said apparatus.*

*44. An apparatus as claimed in claim 43, wherein said control means further comprises a read only memory for storing the length of said plate making area corresponding to one plate and a predetermined program.*

*45. A thermally operated apparatus for making a plate, comprising:*

*a start key for starting a plate making operation;*

*feed means positioned to allow original documents to be fed one by one on and along a glass platen; p1 reading means for reading said documents being fed one by one by said feed means;*

*a thermal head for engraving images of said documents in a roll fed stencil;*

*a stencil transport roller rotatable for transporting said stencil while urging said stencil against said thermal head;*

*setting means for setting a plurality of delimited fields which are to be defined in a plate making area of said stencil side by side in an intended direction of stencil transport so as to produce a plate by a continuous operation, and producing a set signal;*

*cutter means for cutting said transported stencil at a predetermined length in accordance with the plurality of delimited fields when said plate has been completed; and*

*control means for controlling said stencil transport roller in response to said set signal such that when an image of a present document has been formed on one of said plurality of delimited fields of said plate making area of said stencil, rotation of said stencil transport roller is temporarily stopped until said present document has been discharged by said feed means.*

*46. A thermally operated apparatus for making a plate, comprising:*

*a start key for starting a plate making operation;*

*reading means for reading original documents;*

*a thermal head for engraving images of said documents in a roll fed stencil;*

*a stencil transport roller rotatable for transporting said stencil while urging said stencil against said thermal head;*

*setting means for setting a plurality of delimited fields which are to be defined in a plate making area of said stencil side by side in an intended direction of stencil transport so as to produce a plate, and producing a set signal;*

*cutter means for cutting said transported stencil at a predetermined length when said plate has been completed; and*

*control means for controlling said reading means in response to said set signal such that a plurality of original documents are continuously read by said reading means and said plurality of read original documents are engraved in said roll fed stencil by said thermal head.*

*47. A thermally operated apparatus for making a plate, comprising:*

*a start key for starting a plate making operation;*

*feed means positioned to allow original documents to be fed one by one on and along a glass platen;*

*reading means for reading said documents being fed one by one by said feed means;*

*a thermal head for engraving images of said documents in a roll fed stencil;*

*a stencil transport roller rotatable for transporting said stencil while urging said stencil against said thermal head;*

*setting means for setting a plurality of delimited fields which are to be defined in a plate making area of said stencil side by side in an intended direction of stencil transport so as to produce a plate by a continuous operation, and producing a set signal;*

*cutter means for cutting said transported stencil at a predetermined length when said plate has been completed; and*

*control means for controlling said stencil transport roller in response to said set signal such that when an image of a present document has been formed on one of said plurality of delimited fields of said plate making area of said stencil, rotation of said stencil transport roller is temporarily stopped until said reading means starts reading a next document.*

* * * * *